(12) United States Patent
Whitmore

(10) Patent No.: US 9,911,093 B2
(45) Date of Patent: *Mar. 6, 2018

(54) INTELLIGENT SERVICE MANAGEMENT AND PROCESS CONTROL USING POLICY-BASED AUTOMATION AND PREDEFINED TASK TEMPLATES

(71) Applicant: International Business Machines Corporation, Armonk, NY (US)

(72) Inventor: James J. Whitmore, Carlisle, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/142,352

(22) Filed: Apr. 29, 2016

(65) Prior Publication Data

US 2016/0247103 A1    Aug. 25, 2016

Related U.S. Application Data

(63) Continuation of application No. 13/529,274, filed on Jun. 21, 2012, now Pat. No. 9,436,921.

(51) Int. Cl.
*G06Q 10/06* (2012.01)
*G06F 9/46* (2006.01)

(52) U.S. Cl.
CPC ......... *G06Q 10/0633* (2013.01); *G06Q 10/06* (2013.01); *G06F 9/46* (2013.01); *G06Q 10/0631* (2013.01)

(58) Field of Classification Search
None
See application file for complete search history.

(56) References Cited

U.S. PATENT DOCUMENTS 6,115,646 A * 9/2000 Fiszman ............... G06F 9/465
700/104
6,654,732 B1 * 11/2003 Naito ................... G05B 15/02
706/45

(Continued)

OTHER PUBLICATIONS

Johansson et al, Enabling flexible manufacturing systems by using level of automation as design parameter, 2009, IEEE, Proceedings of the 2009 Winter Simulation Conference, pp. 2176-2184.*

(Continued)

*Primary Examiner* — Abu Zar Ghaffari
(74) *Attorney, Agent, or Firm* — Francis Lammes; Stephen J. Walder, Jr.; Thomas E. Tyson

(57) ABSTRACT

Mechanisms are provided for dynamically determining one or more automation levels for tasks of a workflow. The mechanisms receive a workflow from a source component and receiving context and state information for an environment in which the workflow is to be performed. One or more tasks and associated task attributes are identified in the workflow and applying one or more automation rules to the context and state information and the task attributes to generate one or more automation level settings from the one or more tasks. The one or more tasks are performed in the environment in accordance with the one or more automation level settings. The automation level settings specify a degree of automation to be used when performing the one or more tasks.

21 Claims, 5 Drawing Sheets

(56) References Cited

U.S. PATENT DOCUMENTS

| | | | |
|---|---|---|---|
| 7,453,292 B2 * | 11/2008 | Liu | H03K 17/04123 |
| | | | 327/108 |
| 7,725,200 B2 * | 5/2010 | Reed | G05B 19/4184 |
| | | | 700/110 |
| 7,765,291 B1 | 7/2010 | Khan et al. | |
| 8,150,717 B2 | 4/2012 | Whitmore | |
| 8,380,551 B2 * | 2/2013 | Coffman | G06Q 10/06 |
| | | | 705/7.12 |
| 8,627,324 B2 | 1/2014 | Irani et al. | |
| 8,713,146 B2 * | 4/2014 | Pedersen | G06Q 10/06 |
| | | | 705/30 |
| 8,768,738 B2 * | 7/2014 | Jacobs | G06Q 10/02 |
| | | | 705/7.16 |
| 9,009,472 B2 | 4/2015 | Cerruti et al. | |
| 9,009,473 B2 | 4/2015 | Reyna Almandos et al. | |
| 9,621,414 B2 * | 4/2017 | Suda | H04L 41/08 |
| 2002/0065701 A1 | 5/2002 | Kim et al. | |
| 2003/0055668 A1 | 3/2003 | Saran et al. | |
| 2003/0074090 A1 * | 4/2003 | Becka | G06Q 10/06 |
| | | | 700/83 |
| 2003/0120709 A1 * | 6/2003 | Pulsipher | G06F 9/4881 |
| | | | 718/106 |
| 2007/0044151 A1 | 2/2007 | Whitmore | |
| 2009/0144120 A1 | 6/2009 | Ramachandran | |
| 2010/0145774 A1 | 6/2010 | Veshnyakov et al. | |
| 2010/0145904 A1 * | 6/2010 | Riviello | G06Q 10/10 |
| | | | 707/608 |
| 2010/0332585 A1 | 12/2010 | Driesen | |
| 2011/0004885 A1 | 1/2011 | Kikuchi et al. | |
| 2011/0019223 A1 | 1/2011 | Ocke et al. | |
| 2011/0113008 A1 | 5/2011 | Jafri et al. | |
| 2011/0126047 A1 | 5/2011 | Anderson et al. | |
| 2011/0126207 A1 * | 5/2011 | Wipfel | H04L 9/3213 |
| | | | 718/104 |
| 2012/0227044 A1 | 9/2012 | Arumugham | |
| 2012/0242648 A1 * | 9/2012 | Baier | G05B 19/409 |
| | | | 345/418 |
| 2012/0296691 A1 * | 11/2012 | Ethier | G06Q 30/02 |
| | | | 705/7.27 |

OTHER PUBLICATIONS

U.S. Appl. No. 13/529,274.
Lindquist, D. et al., "IBM Service Management architecture", IBM Systems Journal, vol. 46, No. 3, Jan. 2007, pp. 423-440.

* cited by examiner

INTELLIGENT SERVICE MANAGEMENT AND PROCESS CONTROL USING POLICY-BASED AUTOMATION AND PREDEFINED TASK TEMPLATES

BACKGROUND

The present application relates generally to an improved data processing apparatus and method and more specifically to mechanisms for providing intelligent service management and process control using policy-based automation.

Today's society increasingly utilizes computer control mechanisms for controlling various systems that human beings rely upon. These computer control mechanisms must ensure delivery of reliable service and protect from unintended consequences and unwise system behavior that may endanger the public.

Complete computer control of these systems provides a level of efficiency and accuracy that typically cannot be obtained from manual, human based control. However, humans are reluctant to give up complete control to such computer control systems since, no matter how well devised the computer control system may be, there is always the possibility that it may behave in an unintended manner or, while behaving in a proper manner according to its programming, the particular conditions or situation may cause the proper behavior of the computer control system to generate unintended consequences. Thus, it is difficult to determine a proper balance between automated computer control and human based manual control.

SUMMARY

In one illustrative embodiment, a method, in a data processing system, is provided for dynamically determining one or more automation levels for tasks of a workflow. The method comprises receiving a workflow from a source component and receiving context and state information for an environment in which the workflow is to be performed. The method further comprises identifying one or more tasks and associated task attributes in the workflow and applying one or more automation rules to the context and state information and the task attributes to generate one or more automation level settings from the one or more tasks. The method also comprises performing the one or more tasks in the environment in accordance with the one or more automation level settings. The automation level settings specify a degree of automation to be used when performing the one or more tasks.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
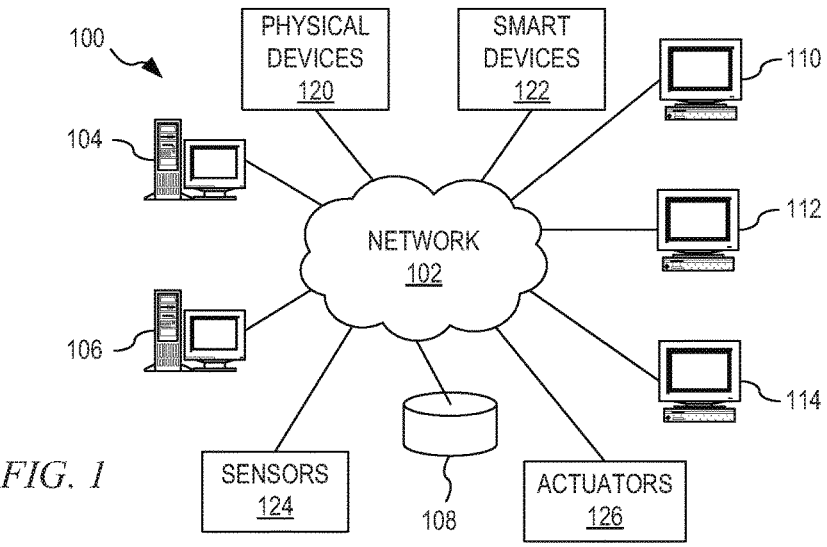
FIG. 1 is an example diagram of a distributed data processing system in which aspects of the illustrative embodiments may be implemented.

The illustrative embodiments provide mechanisms for providing intelligent service management and process control using policy-based automation. The mechanisms of the illustrative embodiments operate to control a balance between human intervention and automated computer control based on policy-based rules and dynamic conditions. As a result, the efficiency of computer control is achieved as much as possible while minimizing risks of unintended consequences or behavior that may endanger human beings.

Operational service management or process control can be thought of as workflows of operator driven or automated tasks. These workflows may support business processes or services, information technology services, industrial control processes, etc. The workflows generally consist of instrumentation, data collection, data analysis, reporting, and management operations.

Management operations in a workflow are often driven by human operator reaction following an alert from the computer system. Management operations may also be automated when the range of operating conditions and associated actions can be fully defined in the computer system. Fully automated management operations are predicated on the ability to forego the intervening manual checkpoints between chained automated transactions.

A key concern for fully automated management is that automation without intervening manual checkpoints has the potential to introduce errors and adverse consequences. Depending on the system being controlled, fully automated self-management of the system can be unwise or even deadly. For example, fully automated control of aircraft control towers, hazardous materials transports, or other inherently dangerous systems would be unwise and can potentially endanger the public. However, complete human control introduces possible sources of error and is extremely inefficient when compared to computer control systems.

Whether and when to execute manual or automated management operations is a critical operational decision in modern systems. For example, International Business Machines Corporation of Armonk, N.Y., has introduced an initiative for increasing computer automation of systems used in society referred to as "Smarter Planet." Smarter Planet is an initiative that examines ways to apply information technology to improve efficiency and effectiveness of infrastructure systems and processes that support and sustain society. Some examples of Smarter Planet related systems are: water management systems, smart electric distribution grids, traffic flow systems and energy efficient buildings. These and related uses for information technology have the potential to be larger in scale, impact and risk than information technology used for a single business enterprise, government agency or user community.

Improvements related to Smarter Planet may come when repetitive work tasks are automated. The term "workflow" is often applied to a sequence of tasks. A workflow may be seen as any abstraction of real work, that is, a depiction of a sequence of operations, that represents the work of a person, or a group of persons. There are many instances of computing systems that facilitate workflow. Some embodiments are: systems that serve instructions that humans may read and follow and acknowledge completion of tasks, systems that can be configured to perform repetitive actions, as in numerical control machines, or systems that automate the management of information technology systems. The Information Technology Infrastructure Library, or ITIL standard, provides an example of a catalog of processes and workflows associated with management of information systems and services.

The decision of whether a workflow is acted out by a human or is performed programmatically by a computer system is one that must take into consideration a large range of factors. For example, these factors may include a system content, operating conditions, applicable threats, operational risks, and processes and assets being controlled. The ability for the system designer, the system installer, the system administrator, or the service user to match the level of automation with the business or technical risks and dynamic operating conditions is referred to herein as "flexible automation" and is the focus of the mechanisms of the illustrative embodiments.

Flexible automation in accordance with the illustrative embodiments provides the system designer, system installer, service administrator, and/or service user to control the automation level of tasks within a workflow that operates on target systems or devices based on automation rules defined by automation policies. A process script can be carried out in several ways, whether by entirely manual techniques, by entirely automated techniques, or using varying steps of manual, assisted, and/or fully automated techniques. Flexible automation, in accordance with the illustrative embodiments, provides the programmable mechanism (control point) that selects the most appropriate automation level for the desired task based on information about the operating environment, business state and conditions, information technology operating state and conditions, business and/or information technology operating rules, business and/or information technology operating risks, business and/or information technology operating objectives, etc. Flexible automation provides for the following possibilities: (1) to maintain a prescribed, or default, automation level for the desired task; (2) to increase the level of automation for the desired task in order to gain efficiencies or productivity; and (3) to reduce the level of automation for the desired task (including escalating the task to human intervention), in order to mediate the affects or consequences of the tasks in relation to the business and technical objectives.

Flexible automation involves delegation. Delegation affects the flow of tasks in a workflow and whether the workflow can be completed with automation or whether human interaction is warranted. In the context of the description of the illustrative embodiments, the term "delegation" relates to the ability of a system designer, a system installer, a service administrator, or a service user, to assert control (no delegation) versus to assign control (delegation) to another person or program entity. A key corollary to delegation is "escalation." Escalation also affects the flow of tasks in a workflow. In the context of the description of the illustrative embodiments, the term "escalation" relates to the ability of an owning person or program entity to relinquish ownership or defer to a higher authority. A system that implements the flexible automation mechanisms of the illustrative embodiments provides for both "delegation" and "escalation" to achieve intelligent service management. This means that automation for service management needs to be controlled in such a way that decisions are "delegated" to software as appropriate, and some "delegated" actions may need to be "escalated" to the attention of a human when warranted.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device, Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™ Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
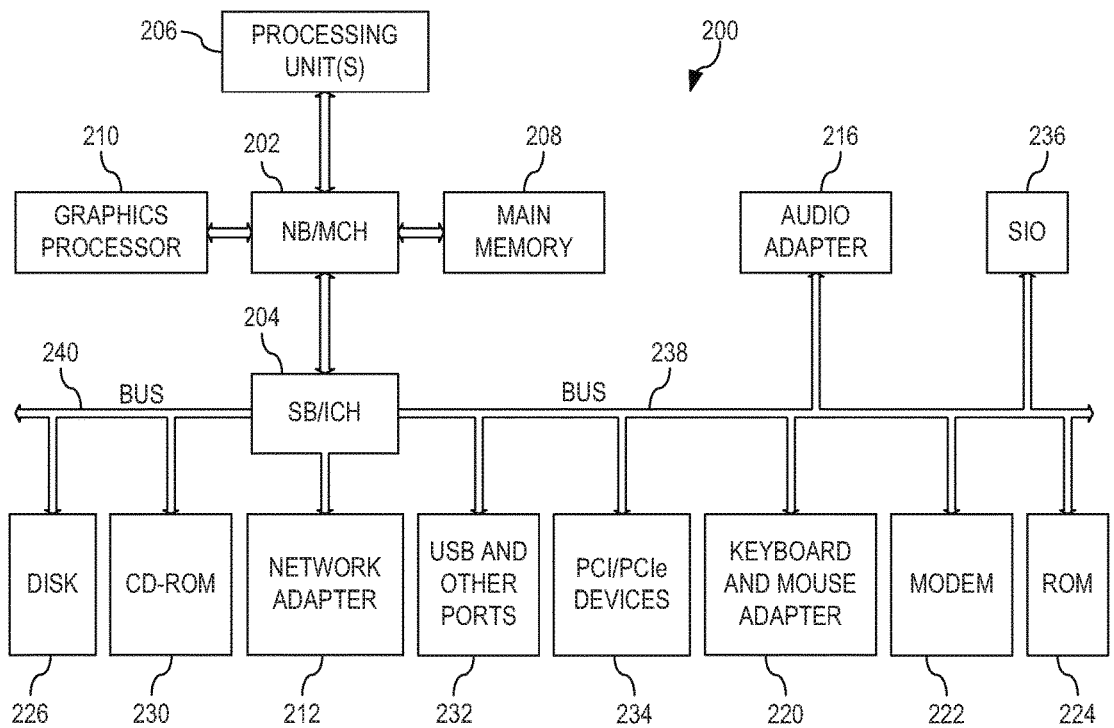
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. The distributed data processing system 100 may further include other devices 120-126 either coupled to the network 102 directly or via one or more other computing devices, such as clients 110, 112, and 114. These other devices 120-126 may be of various types including various physical devices 120, smart devices 122, sensors 124, actuators 126, and the like. Examples of these types of devices include cameras, temperature sensors, fluid flow sensors, valves, and the like. Essentially, any device or system that may perform tasks as part of a workflow may be used without departing from the spirit and scope of the illustrative embodiments. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Moreover, aspects of the mechanisms of the illustrative embodiments may be implemented in, or in association with, other physical devices 120, smart devices 122, sensors 124, actuators 126, or the like. These other physical devices 120, smart devices 122, sensors 124, actuators 126, and the like may be coupled with or otherwise associated with a data processing system or computing device or may be able to be accessed directly via one or more data networks. These physical devices 120, smart devices 122, sensors 124, actuators 126, and the like, may provide metric data for use in determining a level of automation to be utilized as well as may be directly or indirectly (e.g., through another computing device) controlled based on a set level of automation for a task to be performed by the physical device 120, smart device 122, sensor 124, actuator 126, or the like, as part of a workflow.

With reference again to FIG. 1, workflows, which may be comprised of a plurality of different processes, tasks, and the like, may be submitted by various computing devices within the distributed data processing system 100 and the workflow management operations may be performed by one or more of the servers 104, 106 in the data processing system 100. As part of these workflow management operations the servers 104, 106 may perform flexible automation operations in accordance with the illustrative embodiments herein to control the level of automation used to implement the workflows.

Figure 3:
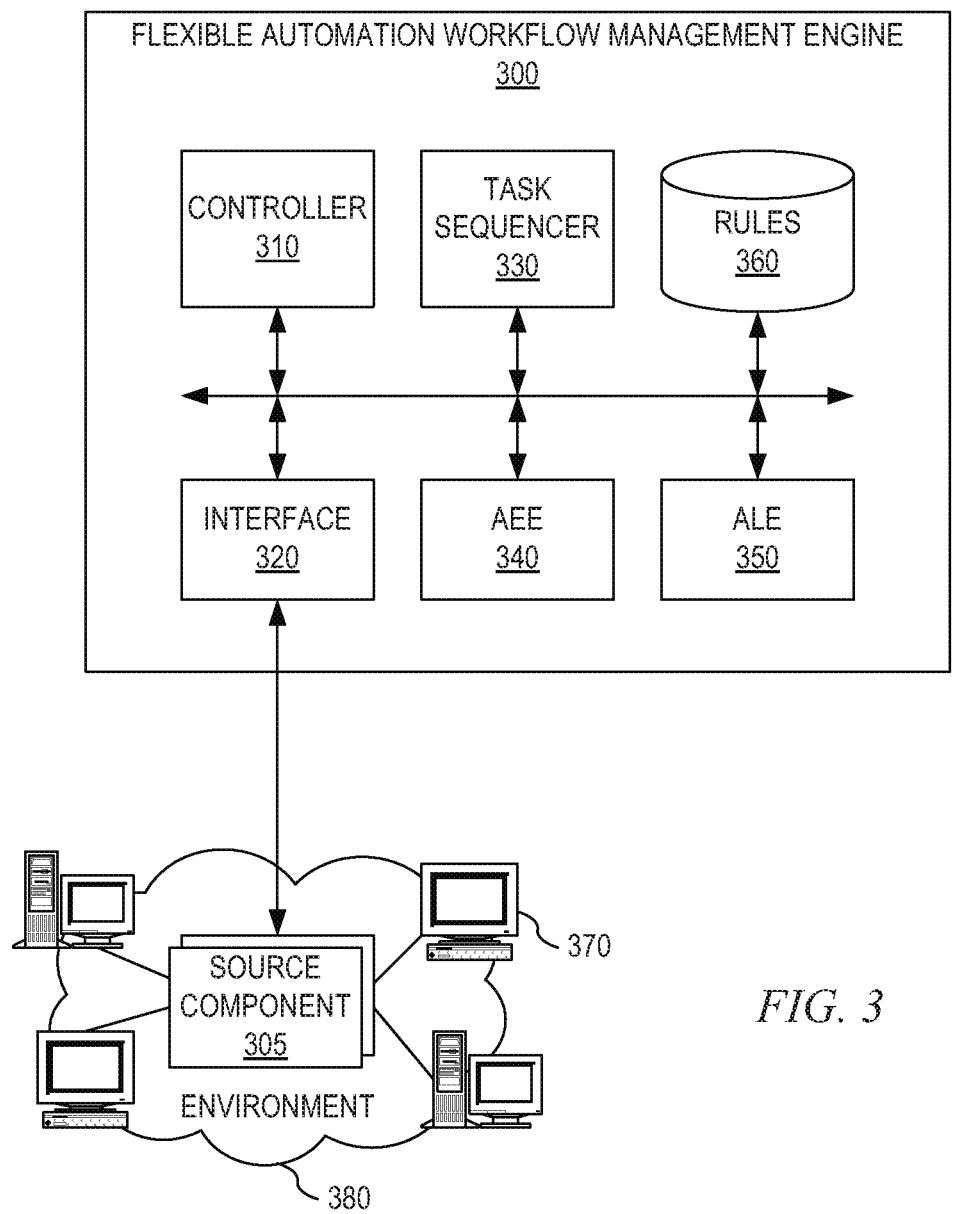
FIG. 3 is an example block diagram illustrating the primary operational elements of a flexible automation workflow management engine in accordance with the illustrative embodiments.

FIG. 3 is an example block diagram illustrating the primary operational elements of a flexible automation workflow management engine in accordance with the illustrative embodiments. The elements shown in FIG. 3 may be implemented as software, hardware, or any combination of software and hardware. In one illustrative embodiment, the elements of FIG. 3 are implemented as software instructions, loaded into one or more memories or other types of storage devices, and executed by one or more processors of one or more data processing devices/systems. In other illustrative embodiments, one or more of the elements of FIG. 3 may be implemented in circuitry, such as firmware for example.

As shown in FIG. 3, the flexible automation workflow management engine 300 comprises a controller 310, an interface 320, a task sequencer 330, an automation evaluation exit (AEE) module 340, an automation level evaluator (ALE) module 350, and a rules database 360. The controller 310 controls the overall operation of the flexible automation workflow management engine 300 and orchestrates the operation of the other elements 320-360. The interface 320 provides a communication pathway through which data may be received and sent. For example, the interface 320 may receive workflows from source components 305, e.g., applications, operating systems, workflow or project management systems, or the like, executing on client computing devices, server computing devices, or the like. The flexible automation workflow management engine 300 may operate on the received workflows and determine various levels of automation for various processes within the workflow. As a result, a corresponding control output may be generated and sent back to the source component to control a level of automation implemented by the source component 305 and its associated components, e.g., other applications, systems, computing devices, physical devices, sensors, actuators, smart devices, and the like. Alternatively, components for implementing the various processes of the workflow may be directly controlled by the flexible automation workflow management engine 300 based on the results of analysis of the workflow by sending appropriate commands directly to these components to cause them to operate in accordance with the level of automation associated with the processes.

Each process in the processes of a workflow may have a different level of automation from one or more other processes of the workflow. Thus, for example, a first process in the workflow may have a different level of automation than that of a second process in the workflow, e.g., the first process is a fully manual or semi-manual process while the second process is a fully automated process. The determination of the appropriate level of automation may be determined based on an analysis of the particular process or task to be performed in relation to pre-established automation rules.

Consider, as one example, a workflow for updating the software that is installed in a computing system. An information system management workflow system could be configured to recognize an input event and command, and carry out the sequence of steps required to update the software on a target computing system, such as source component 305, target system 370, or other target component in the target environment 380. The steps might include: gathering information about the target system, gathering information about the software update, enabling the transfer of software to the target system, invoking the commands to ready the system for update and checking for completion, invoking the commands to apply the update and checking for completion, and finally, performing post processing for completed process, or cleanup in the event that errors have occurred. Flexible operation may be used to optimize the activity of updating software in a computing system where information about the systems involved, the software involved, and other aspects of the operating environment could introduce variability in the workflow. For example, if the target system is identified as "test" environment, then the update could proceed with full automation. If on the other hand the system is identified as "production" environment and is currently "online", it would be prudent to defer the installation until the system is "offline". There are potentially a wide range of system attributes, system states and even time-of-day or day-of-week variables that could contribute to decisions about whether and how to complete the desired workflow.

Returning to FIG. 3, the task sequencer 330 receives a workflow from a source component 305 and performs various operations for scheduling the execution of tasks or processes of the workflow. The term "task sequencer" is a generalized term given to a component of a workflow system that invokes sequences and initiates the tasks in a workflow. Task sequencers are generally known in the art and thus, a detailed description of the sequencing operations performed by task sequencers is not provided herein. With regard to the illustrative embodiments, however, the task sequencer 330 of the illustrative embodiments is modified and configured to operate in conjunction with an automation evaluation exit (AEE) module 340 and automation level evaluator (ALE) 350 as described hereafter. While the task sequencer 330 is shown as a component of the flexible automation workflow management engine 300, it should be appreciated that the task sequencer 330 may in fact be separate from the flexible automation workflow management engine 300 and may in fact be part of a separate workflow management system but is configured to interface with the AEE 340 and/or ALE 350, such as via an application programming interface (API) or other appropriate interface mechanism.

The source component 305 may submit a work order to a workflow management system which maps the work order to a workflow. The workflow may be submitted by the workflow management system to the task sequencer 330 which separates the workflow into its constituent processes or tasks and submits work orders for each of the individual constituent processes or tasks to the AEE 340 to operate upon. The breaking down of the workflow into individual processes or tasks may involve the use of predefined process or task templates. That is, the task sequencer 330 may compare processes or tasks of a workflow to predefined templates, determine the template associated with each process or task in the workflow, and generate a set of process/task templates to be used to define the workflow within the task sequencer 330. These templates may then be converted to work orders that conform with the process/task template. The work orders are then provided to the ALE 350 to determine an appropriate level of automation for the corresponding work order.

The AEE 340 invokes the ALE 350 to examine the work order, its context information, and any other available information regarding the current state of the environment in which the process or task is to be performed. In one illustrative embodiment, this context information and other available information comprises the current state of the environmental variables, and the like, of the source component 305 and/or the system(s) in which the source component 305 is present or with which it operates, e.g., congestion levels, available bandwidth, processor utilization, memory utilization, personnel availability, storage availability, equipment availability, etc. This information may be in the form of fixed parameters that are coded in the work order, information that is gathered from the system at the time of execution, or the like. The set of context information and state information gathered and utilized is implementation specific and may encompass any context/state information that is able to be obtained from the source component 305 and the system(s) associated with the source component 305. The context/state information to be utilized may be selected so as to provide sufficient information for determining a level of risk associated with different levels of automation without being so comprehensive as to slow the mechanisms to a point where they create too much delay in the overall operation of the flexible automation workflow management engine 300.

One attribute of the work orders generated by the task sequencer 330 is an automation level. The automation level may or may not have been set by the source component 305 submitting the workflow. If not explicitly set by the source component 305 submitting the workflow, then this automation level may be given a default value. This automation level attribute of the work order may be dynamically modified, e.g., downgraded or upgraded (escalated) based on the application of automation rules from the rules database 360 to the work order and the context/state information. For purposes of the present description, as a convention, it will be assumed that a downgrade of the automation level refers to setting the automation level attribute to a value that is closer to full manual execution of the corresponding process/task. Similarly, an upgrade of the automation level refers to setting the automation level attribute to a value that is closer to full automated execution of the corresponding process/task.

Various automation rules from the rules database 360 may be applied by the ALE 350 to the work order, the context information, and the current state information, to analyze the work order and the context/state information and determine an appropriate level of automation for the corresponding process/task taking into consideration the current dynamic context/state of the environment in which the process/task is to be executed. The application of these automation rules to the work order and the context/status information results in a determination as to whether the automation level attribute of the work order should be maintained at its current value, upgraded, or downgraded and by how much, if any, the automation level attribute of the work order should be upgraded/downgraded.

The particular application of the rules to particular portions of the work order and context/status information is implementation specific and may take many different forms. The following are examples of the types of rules that may be used with the mechanisms of the illustrative embodiments:

A) maintain, upgrade, or downgrade the automation level attribute based on the productivity of the user role associated with the process/task;

B) maintain, upgrade, or downgrade the automation level attribute based on the context of the source component submitting the workflow;

C) maintain, upgrade, or downgrade the automation level attribute based on an alignment of the process/task with defined business rules or risks;

D) maintain, upgrade, or downgrade the automation level attribute based on a determined impact of the process/task on other elements/objects of the source component and/or related system(s) and components; and E) maintain, upgrade, or downgrade the automation level attribute based on an alignment of the process/task with operating conditions of the source component 305 and/or related system(s) and components.

The automation rules may be specified in terms of automation policies that are stored in association with the ALE 350. Preferably, the automation policies/rules are defined to promote self-management of the workflow. In the context of the present description, self-management refers to the ability to reduce the number of units of work required to perform the particular processes/tasks of the workflow, reduce the amount of time required to complete the processes/tasks of the workflow, and adapt the workflow to align with business and technical needs as identified by business rules and current context/state information.

These automation policies/rules may have various forms including declarative form, simple condition form, stateful conditional form, or goal based form. A declarative form of policy/rule declares an automation level attribute setting without specifying conditionals. For example, a declarative policy/rule may be of the type "All operators will use manual automation (M)" or "All operators can select manual (M), semi-automated (S), or fully automated (A)."

A simple conditional policy/rule may take the form of "if <condition> then <action>." An example of such a simple conditional policy/rule is "if (mode) then (task); Production, (M); Test, (A)" which sets the automation level to manual if the mode is a production mode and automated if the mode is a test mode. Another example conditional policy/rule is "if (role) then (task); Operator, (S); Administrator, (M); Analyst, <any>; User, <none>" which sets the automation level to various settings of semi-automated, manual, and automated based on the role of the user/source component that initiated the workflow or is associated with the particular process/task corresponding to the work order. Another example conditional policy/rule is "if (CI-info) then (task); "recently changed", (M); "error", (S); "composite", (A)" which sets the automation level based on the context information (CI-info) indicating that the context of the process/task has either recently changed, has experienced an error condition, or is a composite (made up of two or more parts)

A workflow system may keep a historical record of actions taken in order to prevent endless loops, or to adapt to changing conditions. This historical information would reflect the state of the system and could be used to modify future system behavior. A stateful conditional automation rule may be of an "if-then" form where the "if" condition relies on state information. An example may be "if (prior automation count) >3 then escalate one level."

A goal policy/rule format may define an end-state, but not necessarily how to attain the end state. A goal policy/rule format may be of the type "if (policy conflict) then escalate to Manual." This policy/rule states that the end-state should be a manual automation level if a policy conflict is detected, but does not state how to change the automation level to the manual state, e.g., upgrading/downgrading or maintaining the current automation level setting.

A combination of these various rules may be applied to various attributes of the work order, the context information, and the state information and the results combined to generate a final determination as to an appropriate level of automation for the particular process/task corresponding to the work order. Various ways of combining the results of the application of these automation rules may be used without departing from the spirit and scope of the illustrative embodiments. For example, a majority rule may be utilized, a highest level of automation (where highest is closer to full automation) may be selected from the various results, a lowest level of automation (where lowest is closer to fill manual execution) may be selected from the various results, a weighting of different automation rules may be used so that a combined score may be generated and the score compared to one or more thresholds indicates whether the automation level attribute should be maintained, upgraded, or downgraded and by how much, etc.

Based on the application of the automation rules to the various attributes of the work order and the context/status information, the ALE 350 may select an automation level modification plan to be implemented. For example, the automation level modification plan may comprise one of:

A) do not change the automation level attribute selected by the source component that initiated the workflow;

B) upgrade the automation level attribute (delegate the process/task);

C) downgrade the automation level attribute (escalate the process/task); or

D) set an appropriate level of automation to a particular automation level attribute setting.

Once an automation level modification plan has been selected by the ALE 350 based on the application of the automation policies/rules defined in the rules database 360, the ALE 350 may either initiate transmission of commands to appropriate components to implement the workflow in accordance with the automation level modification plan, or may return the automation level modification plan to the source component 305 for implementation. As a result, the level of automation used to implement the various processes/tasks of the workflow is adapted to the current context/state and is brought into compliance with the established automation policies/rules. As a result, the level of automation may be made flexible within the system so as to achieve a balance of efficiency due to automation and security/reduction of risk associated with manual monitoring/implementation of operations.

Figure 4:
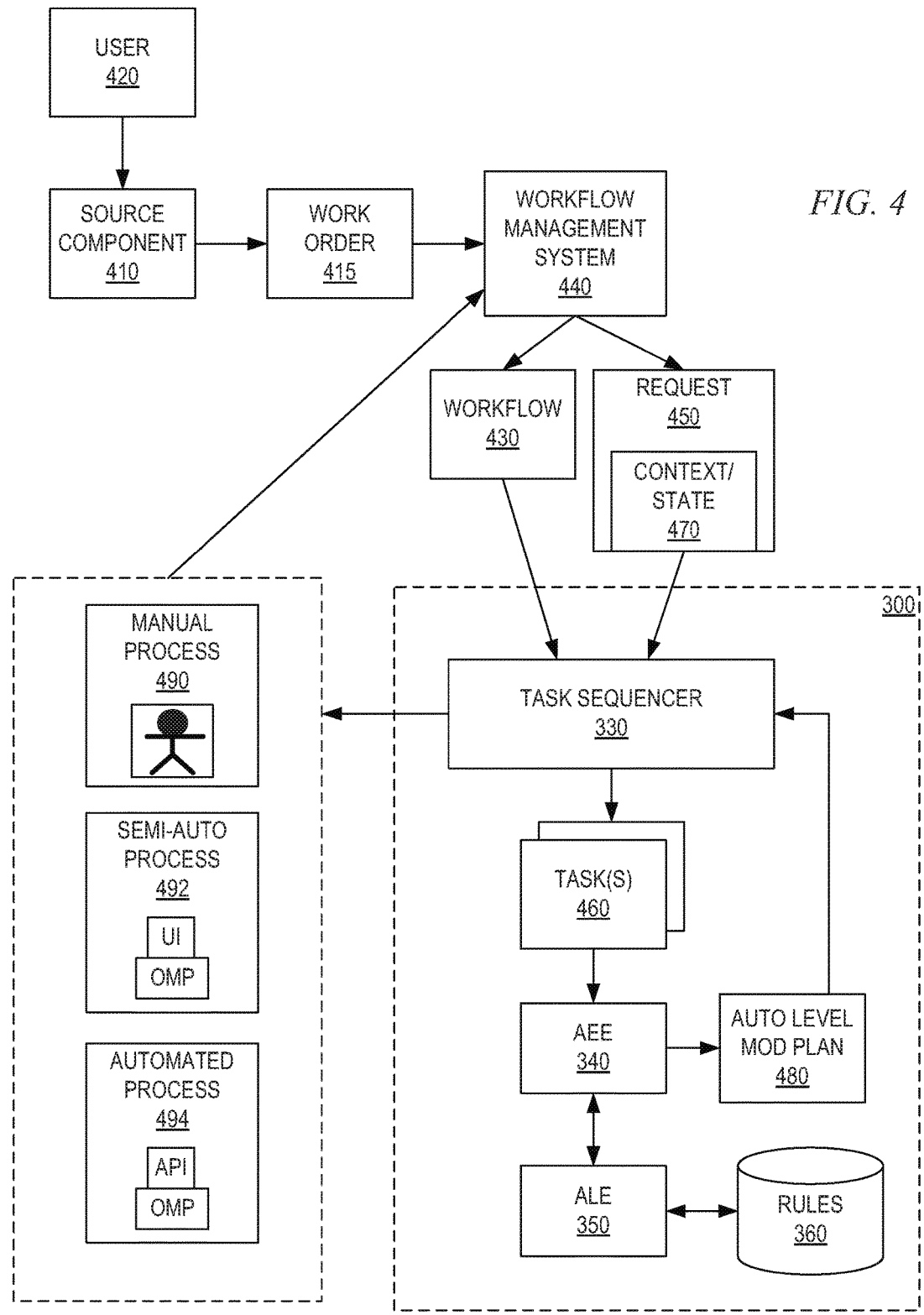
FIG. 4 is an example diagram illustrating the operation of the elements of FIG. 3 with regard to a workload submitted from an originating component in accordance with one illustrative embodiment.

FIG. 4 is an example diagram illustrating the operation of the elements of FIG. 3 with regard to a workload submitted from a source component in accordance with one illustrative embodiment. As shown in FIG. 4, a source component 410, either automatically or at the direction of a user 420, may generate a work order 415 that identifies the work to be done and what elements of one or more systems are to be controlled, i.e. the work order 415 defines what is to be performed using one or more systems of one or more organizations. The work order 415 may have an associated role attribute that identifies the role of the initiator of the work order 415. This role may be general, such as "human" or "process", or may be more specific and may specify a particular seniority or ranking of the user/system/application that is the initiator of the work order 415, e.g., "administrator," "end user," "operating system", "security application" or the like. Any type of role designation may be used without departing from the spirit and scope of the illustrative embodiments. The role designation may be manually or automatically assigned to the work order 415 based on the initiation of the work order 415 such that if a particular user initiates the work order 415, for example, and the user's profile has a particular role attribute, that role attribute may be automatically attached to the work order 415 in the role attribute of the work order 415.

The work order 415 is provided to a workflow management system 440 which may interface with the flexible automation workflow management engine 300 of the illustrative embodiments. The workflow management system 440 may map the work order 415 to a workflow 430 and transmit the workflow 430 along with a request 450, having the gathered context/state information of the system(s) associated with the workflow 430, to the flexible automation workflow management engine 300.

That is, the context/state information may be supplied to the task sequencer by the workflow management system 440. The workflow management system 440 may query and gather the context/state information before forwarding the request 450 to the task sequencer 330.

The task sequencer 330 applies task templates to the workflow 430 to generate a one or more task(s) 460 which are provided to the AEE 340 along with the context/state information 470 obtained in the request 450. The task(s) 460 may be provided as data structures defining the task(s) that need to be accomplished as part of the workflow and the particular ordering of these task(s) within the workflow. The AEE 340 invokes the ALE 350 which applies automation policies/rules from the rules database 360 to the task(s) 460 and context/state information 470 to determine a workflow automation level modification plan 480 that is returned to the AEE 340 specifying one or more modification operations to modify the level of automation associated with the task(s) 460. The AEE 340 returns the plan 480 to the task sequencer 330 which may then automatically implement the plan and initiate control of the performance of the task corresponding to the task(s) 460 directly (as illustrated by the dashed box) or may return the automation level setting for the task to the source component 410 for implementation. As shown in the dashed box in FIG. 4, the levels of automation in this example may be a manual process 490, a semi-automated process 492 involving user interaction with a user interface (UI) that in turn works with an operations management program (OMP), or an automated process 494 in which an application programming interface (API) is used to interface between the source component 410 and the operations management program (OMP) to perform the corresponding task automatically.

Figure 5:
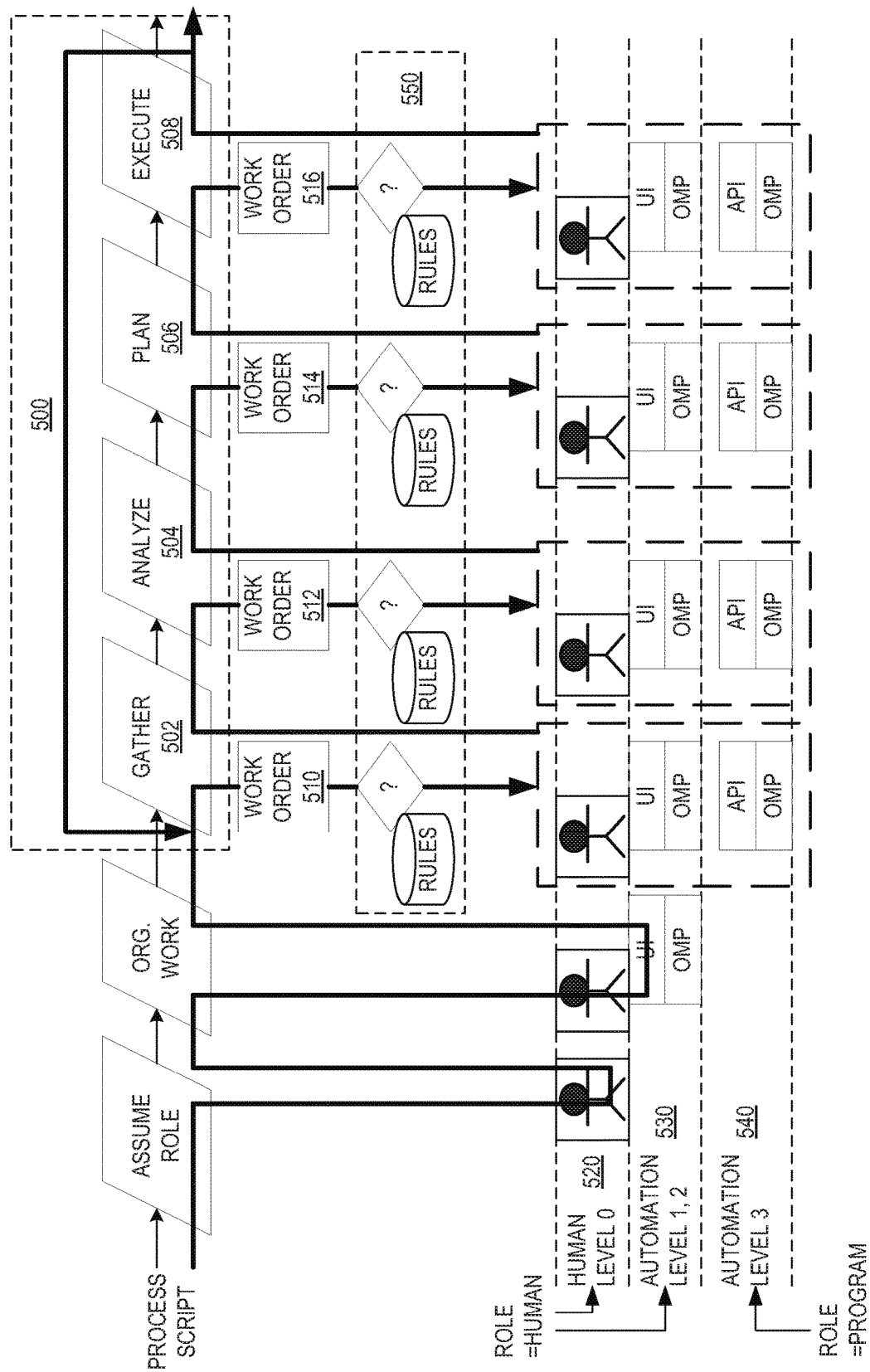
FIG. 5 is an example diagram of a workflow upon which the flexible automation workflow management engines of the illustrative embodiments may operate.

To better understand the flexible automation operations of the illustrative embodiments, it is first helpful to consider a workflow example such as illustrated in FIG. 5. FIG. 5 is an illustration of an example of a repetitive workflow that a skilled worker might perform. The workflow includes four steps: (1) Gather Information, (2) Analyze Information, (3) Plan one or more courses of action based on Analysis of Information and (4) Execute a selected the course of action. Applying this illustration to the illustrative embodiments, one can see that the skilled worker needs to interface with the information technology system. The step identified "assume role" represents the tasks that the skilled worker completes in order to pass identification and authorization checks. This is often referred to as a "login process". The step identified as "organize work" represents the tasks that the skilled worker completes in order to prepare for performing the skilled tasks in the workflow (Gather, Analyze, Plan, Execute). This step might include setting the default level of automation, reviewing previous system history, or signaling to the system that the skilled worker is ready for work.

In this example, various levels of automation will be utilized. Level 0 correlates to a completely manually implemented task. Level 1 correlates to a manual process with user interface (UI) assistance for providing visualization and prompting for user inputs. Level 2 correlates to a semi-automatic process with UI assistance by providing Launch in Context (LIC) to underlying operations management programs (OMPs), where the OMPs are software mechanism that interface to resources that are to be managed.

Level 3 correlates to a primarily automated process with direct software integration to underlying operations management programs (OMPs), with or without user awareness or control.

As shown in FIG. 5, initially, a user assumes the user's role 510 (e.g., administrator, analyst, operator, etc.) and organizes the work to be performed through a semi-automated process in which the user interacts with an OMP via a user interface (UI) to generate a work order that is mapped to a workflow 500 (the user interaction is illustrated as being at automation levels 1, 2). The workflow 500 is provided to the mechanisms of the illustrative embodiments which analyze the tasks 502-508 of the workflow 500, compare them to predefined task templates, and generate work orders 510-516 for the various tasks. The illustrative embodiments then take the next task in the workflow 500, e.g., task 502, and apply automation policies/rules to the work order 510 to determine a level of automation to be used with the task 502 corresponding to the work order 510 (element 550). In the depicted example, the automation policy comprises three rules: 1) if role=human, then maintained pre-determined automation level; 2) if role=program, then set automation level to 3; and 3) if role=program, and error=yes, then escalate automation level (towards manual).

The level of automation may be one of a plurality of different automation levels ranging from a fully manual level to a fully automatic level. For example, in the depicted example, the automation level may be one of manual 520 requiring human intervention to cause the task to be completed correctly, semi-automatic 530 in which a user interface with automated mechanisms and monitors/controls the operation of these automated mechanisms, e.g., a user using a user interface (UI) interfaces with an operations management program (OMP) to perform the task 502-508, or automatic 530 in which APIs are used to automatically interface and initiate operations by the OMP to perform the task 502-508.

This determination of automation level is performed for each work order 510-516 either simultaneously or in succession. The determination is based on the application of automation rules to the attributes of the work order 510-516 as well as the context/state information of the systems that are involved in performing the workload 500. The results of the determinations are then utilized to update the automation level attributes of the tasks 502-508 to cause these tasks to be performed according to the corresponding dynamically generated automation level, Thus, the illustrative embodiments provide mechanisms for flexible determination of an automation level for processes/tasks of a workflow based on the attributes associated with the particular processes/tasks and the current context/state of the environment in which the processes/tasks are to be executed. The mechanisms of the illustrative embodiments apply automation policies/rules to the attributes of the tasks/processes of the workflow as well as the context/state information to determine an appropriate level of automation for the task/process under the current context/state of the environment. In some illustrative embodiments, this is essentially a determination of the level of risk that a negative result will be generated by execution of the process/task in an automated fashion. In other words, the application of the automation policies/rules essentially determines that, under the current conditions (as identified by the context/state information), what is the risk that automated execution of a task/process may result in any of a number of different negative outcomes. If that risk is sufficiently high, then more manual intervention is appropriate. However, if that risk is sufficiently low, then a more automated approach is warranted so as to achieve greater efficiency in the execution of the task. The measure of risk is made by the application of the automation rules and the sufficiency or a predicted risk is determined in comparison to one or more thresholds.

Figure 6:
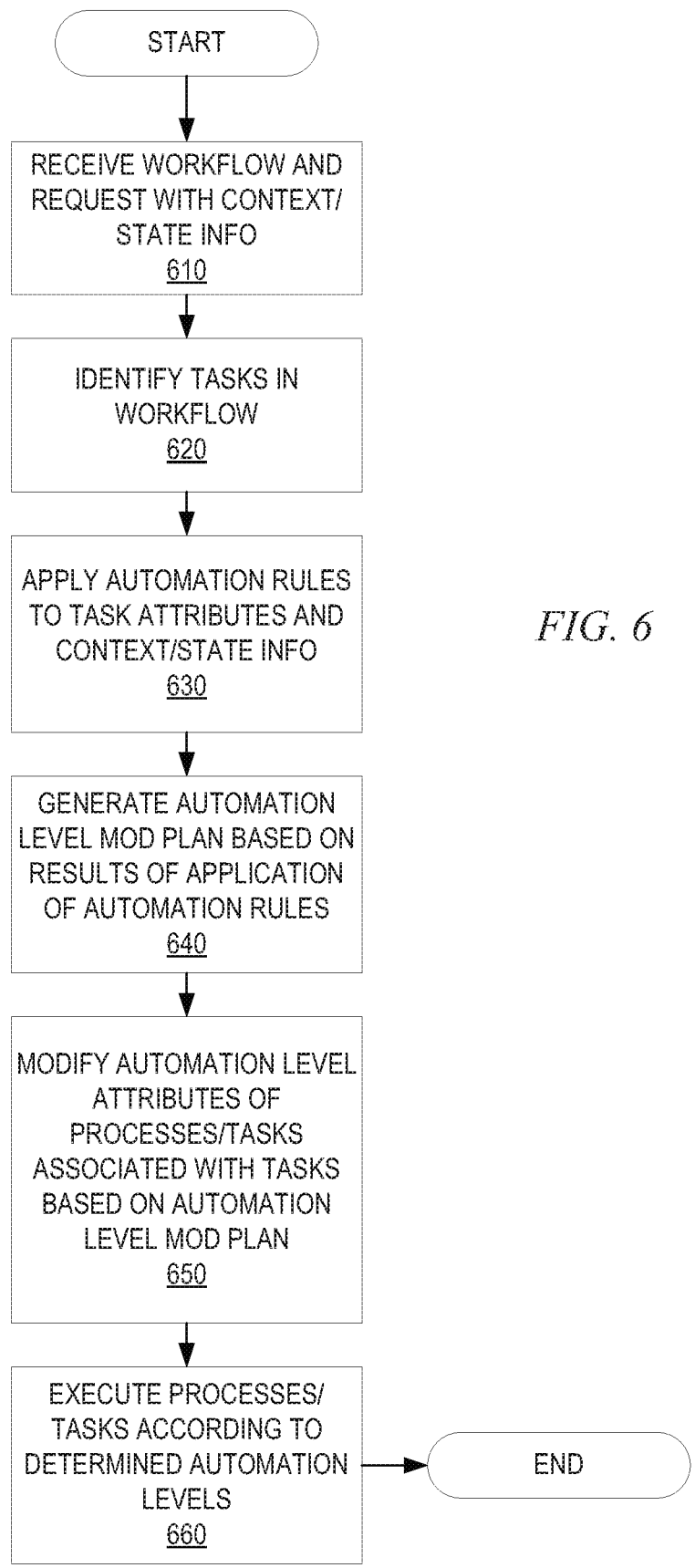
FIG. 6 is a flowchart outlining an example operation for performing a flexible automation determination for a workflow in accordance with one illustrative embodiment.

FIG. 6 is a flowchart outlining an example operation for performing a flexible automation determination for a workflow in accordance with one illustrative embodiment. The operation outlined in FIG. 6 may be implemented, for example, by a flexible automation workflow management engine, such as mechanism 300 in FIG. 3.

As shown in FIG. 6, the operation starts by receiving a workflow and a request with context/state information for the environment in which the workflow is to be executed (step 610). Tasks in the workflow are identified (step 620). Automation rules are applied to the task attributes and context/state info to determine various appropriate levels of automation for the various tasks associated with the work order(s) (step 630). An automation level modification plan is generated based on the results of the determination of appropriate automation levels for the tasks as determined from the application from the automate rules (step 640). Automation level attributes of processes/tasks are modified based on the automation level modification plan (step 650). The various processes/tasks of the workflow are then executed in the environment using the automation levels determined in accordance with the operation (step 660). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for dynamically determining one or more automation levels for a set of work orders identified for a set of tasks in a workflow, comprising:
identifying two or more tasks and task attributes associated with each task in the two or more tasks in the workflow, wherein the workflow is within an environment in which the workflow is to be performed and wherein identifying the two or more work orders from the two or more tasks in the workflow comprises:
comparing the each task within the two or more tasks in the workflow to a set of predefined task templates in order to identify a task template associated with the task;
utilizing the identified two or more task templates for the corresponding two or more tasks to thereby define the workflow based on the identified two or more task templates from the set of predefined task templates; and
converting the each task in the identified two or more task templates to a work order thereby creating the two or more work orders that conform to the identified two or more task templates;
applying one or more automation rules to context information of the environment and state information of the environment as well as the task attributes associated with the each task in the two or more tasks identified from the workflow to generate an individualized automation level setting for each work order of two or more work orders generated from the two or more tasks in the workflow, wherein applying the one or more automation rules to the context information, the state information, and the task attributes to generate the individualized automation level setting for each of the two or more work orders comprises evaluating the context information and the state information according to conditions specified in the one or more automation rules and setting each individualized automation level setting to a first setting based on the context information and the state information satisfying the conditions specified in the one or more automation rules and setting each individualized automation level setting to a second setting based on the context information and the state information not satisfying the conditions specified in the one or more automation rules; and
performing the each of work order of the two or more work orders in the environment in which the workflow is to be performed in accordance with its associated individualized automation level setting, wherein the individualized automation level setting specifies a degree of automation to be used when performing the work order.

2. The method of claim 1, wherein applying the one or more automation rules comprises at least one of:
maintaining the individualized automation level setting for each work order in the two or more work orders;
increasing the individualized automation level setting for one or more work orders in the two or more work orders to thereby increase an amount of automation used to perform the one or more work orders; or
decreasing the individualized automation level setting for the one or more work order in the two or more work orders to reduce an amount of automation used to perform the one or more work orders and increase an amount of manual intervention in the performance of the one or more work orders.

3. The method of claim 1, wherein the degree of automation is within a range of automation having a first bound corresponding to a fully automatic automation level setting and a second bound corresponding to a fully manual automation level setting.

4. The method of claim 1, wherein at least two of the two or more work orders have different associated automation levels settings.

5. The method of claim 1, wherein the context information and the state information comprises one or more environmental variables specifying a current state of availability of one or more components of the environment required to perform at least one of the two or more work orders.

6. The method of claim 1, wherein the one or more automation rules comprise at least one of a declarative automation rule, a simple conditional automation rule, a stateful conditional automation rule, or a goal based automation rule.

7. The method of claim 1, wherein performing the two or more work orders in the environment in accordance with the individualized automation level settings comprises transmitting a command to a component of the environment to cause the component to operate in accordance with the individualized automation level setting corresponding to the component.

8. A computer program product comprising a non-transitory computer readable storage medium having a computer readable program stored therein, wherein the computer readable program, when executed on a computing device, causes the computing device to:
identify two or more tasks and associated task attributes associated with each task in the two or more tasks in the workflow, wherein the workflow is within an environment in which the workflow is to be performed and wherein the computer readable program causes the computing device to identify the two or more work orders from the two or more tasks in the workflow by:
comparing the each task within the two or more tasks in the workflow to a set of a predefined task templates in order to identify a task template associated with the task;
utilizing the identified two or more task templates for the corresponding to two or more tasks to thereby define the workflow based on the identified two or more task templates from the set of predefined task templates; and
converting the each task in the identified two or more task templates to a work order thereby creating the two or more work orders that conform to the identified two or more task templates;
apply one or more automation rules to context information of the environment and state information of the environment as well as the task attributes associated with the each task in the two or more tasks identified from the workflow to generate an individualized automation level setting for each work order of two or more work orders generated from the two or more tasks in the workflow, wherein the computer readable program causes the computing device to apply the one or more automation rules to the context information, the state information, and the task attributes to generate the individualized automation level setting for each of the two or more work orders comprises evaluating the context information and the state information according to conditions specified in the one or more automation rules and setting each individualized automation level setting to a first setting based on the context information and the state information satisfying the conditions specified in the one or more automation rules and setting each individualized automation level setting to a second setting based on the context information and the state information not satisfying the conditions specified in the one or more automation rules; and perform the each work order of the two or more work orders in the environment in which the workflow is to be performed in accordance with its associated individualized automation level setting, wherein the individualized automation level setting specifies a degree of automation to be used when performing the work order.

9. The computer program product of claim 8, wherein the computer readable program causes the computing device to apply the one or more automation rules by at least one of:
    maintaining the individualized automation level setting for each work order in the two or more work orders;
    increasing the individualized automation level setting for one or more work orders in the two or more work orders to thereby increase an amount of automation used to perform the one or more work orders; or
    decreasing the individualized automation level setting for the one or more work order in the two or more work orders to reduce an amount of automation used to perform the one or more work orders and increase an amount of manual intervention in the performance of the one or more work orders.

10. The computer program product of claim 8, wherein the degree of automation is within a range of automation having a first bound corresponding to a fully automatic automation level setting and a second bound corresponding to a fully manual automation level setting.

11. The computer program product of claim 8, wherein at least two of the two or more work orders have different associated automation levels settings.

12. The computer program product of claim 8, wherein the context information and the state information comprises one or more environmental variables specifying a current state of availability of one or more components of the enviromnent required to perform at least one of the two or more work orders.

13. The computer program product of claim 8, wherein the one or more automation rules comprise at least one of a declarative automation rule, a simple conditional automation rule, a stateful conditional automation rule, or a goal based automation rule.

14. The computer program product of claim 8, wherein the computer readable program causes the computing device to perform the two or more work orders in the environment in accordance with the individualized automation level settings comprises transmitting a command to a component of the environment to cause the component to operate in accordance with the individualized automation level setting corresponding to the component.

15. An apparatus, comprising:
    a processor; and
    a memory coupled to the processor, wherein the memory comprises instructions which, when executed by the processor, cause the processor to:
    identify two or more tasks and associated task attributes associated with each task in the two or more tasks in the workflow, wherein the workflow is within an environment in which the workflow is to be performed and wherein the instructions cause the processor to identify the two or more work orders from the two or more tasks in the workflow by:
        comparing the each task within the two or more tasks in the workflow to a set of predefined task templates in order to identify a task template associated with the task;
        utilizing the identified two or more task templates for the corresponding two or more tasks to thereby define the workflow based on the identified two or more task templates from the set of predefined task templates; and
    apply one or more automation rules to context information of the environment and state information of the environment as well as the task attributes associated with the each task in the two or more tasks identified from the workflow to generate an individualized automation level setting for each work order of two or more work orders generated from the two or more tasks in the workflow, wherein the instructions cause the processor to apply the one or more automation rules to the context information, the state information, and the task attributes to generate the individualized automation level setting for each of the two or more work orders comprises evaluating the context information and the state information according to conditions specified in the one or more automation rules and setting each individualized automation level setting to a first setting based on the context information and the state information satisfying the conditions specified in the one or more automation rules and setting each individualized automation level setting to a second setting based on the context information and the state information not satisfying the conditions specified in the one or more automation rules; and
    perform the each work order of the two or more work orders in the environment in which the workflow is to be performed in accordance with its associated individualized automation level setting, wherein the individualized automation level setting specifies a degree of automation to be used when performing the work order.

16. The apparatus of claim 15, wherein the instructions cause the processor to apply the one or more automation rules by at least one of:
    maintaining the individualized automation level setting for each work order in the two or more work orders;
    increasing the individualized automation level setting for one or more work orders in the two or more work orders to thereby increase an amount of automation used to perform the one or more work orders; or
    decreasing the individualized automation level setting for the one or more work order in the two or more work orders to reduce an amount of automation used to perform the one or more work orders and increase an amount of manual intervention in the performance of the one or more work orders.

17. The apparatus of claim 15, wherein the degree of automation is within a range of automation having a first bound corresponding to a fully automatic automation level setting and a second bound corresponding to a fully manual automation level setting.

18. The apparatus of claim 15, wherein at least two of the two or more work order have different associated automation levels settings.

19. The apparatus of claim 15, wherein the context information and the state information comprises one or more environmental variables specifying a current state of availability of one or more components of the environment required to perform at least one of the two or more work orders.

20. The apparatus of claim 15, wherein the one or more automation rules comprise at least one of a declarative automation rule, a simple conditional automation rule, a stateful conditional automation rule, or a goal based automation rule.

21. The apparatus of claim 15, wherein the instructions cause the processor to perform the two or more work orders in the environment in accordance with the individualized automation, level settings comprises transmitting a command to a component of the environment to cause the component to operate in accordance with the individualized automation level setting corresponding to the component.

* * * * *